(12) United States Patent
Roach et al.

(10) Patent No.: US 6,728,861 B1
(45) Date of Patent: Apr. 27, 2004

(54) QUEUING FIBRE CHANNEL RECEIVE FRAMES

(75) Inventors: Bradley Roach, Newport Beach, CA (US); Raul Oteyza, Lakewood, CA (US); Karl M. Henson, Rancho Santa Margarita, CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 10/382,728

(22) Filed: Mar. 4, 2003

Related U.S. Application Data

(60) Provisional application No. 60/419,318, filed on Oct. 16, 2002.

(51) Int. Cl.[7] ............................................. G06F 12/06
(52) U.S. Cl. ........................ 711/220; 710/30; 710/39; 711/5
(58) Field of Search .............................. 710/30, 39, 52; 711/1, 5, 203, 204, 213, 216, 220

(56) References Cited

U.S. PATENT DOCUMENTS

| | | | | |
|---|---|---|---|---|
| 4,320,455 A | * | 3/1982 | Woods et al. .............. | 710/200 |
| 4,809,155 A | * | 2/1989 | Costes et al. ............... | 710/27 |
| 6,061,351 A | * | 5/2000 | Erimli et al. .............. | 370/390 |
| 2003/0095447 A1 | * | 5/2003 | Dean ........................ | 365/200 |
| 2003/0112250 A1 | * | 6/2003 | Wasserman et al. ........ | 345/572 |
| 2003/0169263 A1 | * | 9/2003 | Lavelle et al. ............. | 345/531 |
| 2003/0174137 A1 | * | 9/2003 | Leung et al. .............. | 345/531 |

* cited by examiner

Primary Examiner—B. James Peikari
(74) Attorney, Agent, or Firm—Morrison & Foerster LLP

(57) ABSTRACT

A frame receive queue may perform disassembly and validation operations on frames received by a node in a Fiber Channel network. The frame receive queue may store information used for later processing of the frames, e.g., header data and the first eight payload words, in an on-chip memory for fast processor access. The payload data for the frames may be stored in a larger, external memory.

21 Claims, 5 Drawing Sheets

QUEUING FIBRE CHANNEL RECEIVE FRAMES

CROSS-REFERENCE TO RELATED APPLICATIONS

This application claims priority to U.S. Provisional Application Serial No. 60/419,318, filed on Oct. 16, 2002 and entitled, "Method of Queuing Fibre Channel Receive Frames."

BACKGROUND

Electronic data systems are frequently interconnected using network communication systems. Networks and channels are two approaches that have been developed for computer network architectures. Traditional networks (e.g., LANs and WANs) offer flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a network standard known as "Fibre Channel," which is defined by American National Standards Institute (ANSI) specifications, such as X3.230 (1994). Fibre Channel systems attempt to combine the speed and reliability of channels with the flexibility and connectivity of networks.

Data in a Fibre Channel network is transported in packets, which may be two kilobytes or smaller. These packets, of data are referred to as "frames." "Sequences" include one or more frames. Frames in a sequence must be assembled at the receiving device in a predetermined order before the sequence can be considered complete.

A processor in the receiving device may validate each received frame. Validation may include checking the frames for errors and determining whether the frames are being received in the correct sequence. The processor may not be able to perform this validation as quickly as the frames are received, e.g., at "wire speed." Validation may require a significant amount of post processing and consume processor resources.

SUMMARY

A device in a Fibre Channel network may include a frame receive queue coupled to a node port. The frame receive queue may receive frames from the node port and extract the Start-of-Frame(SOF) and End-of-Frame (EOF) delimiters for the frame and the header and first eight words in the payload (PLW 0–7). The frame receive queue may alternate the storing of this information between two memory banks. Frame validation circuitry may use the information in the memory banks to perform consistency checks on received frames and produce a result for each frame.

Each received frame may be associated with a buffer number, which may serve as a partial address for the frame. An address generator may use the buffer number to generate an address for a random access memory (RAM) in which the SOF, EOF, header, and PLW 0–7 for the frame are stored. The address generator may also use the buffer number to generate an address for a local memory in which the payload for the frame is stored.

The frame receive queue may generate an entry including the SOF, EOF, buffer number, and validation results for the frame. The entry may be stored in a completion RAM in the frame receive queue.

DETAILED DESCRIPTION

Figure 1:
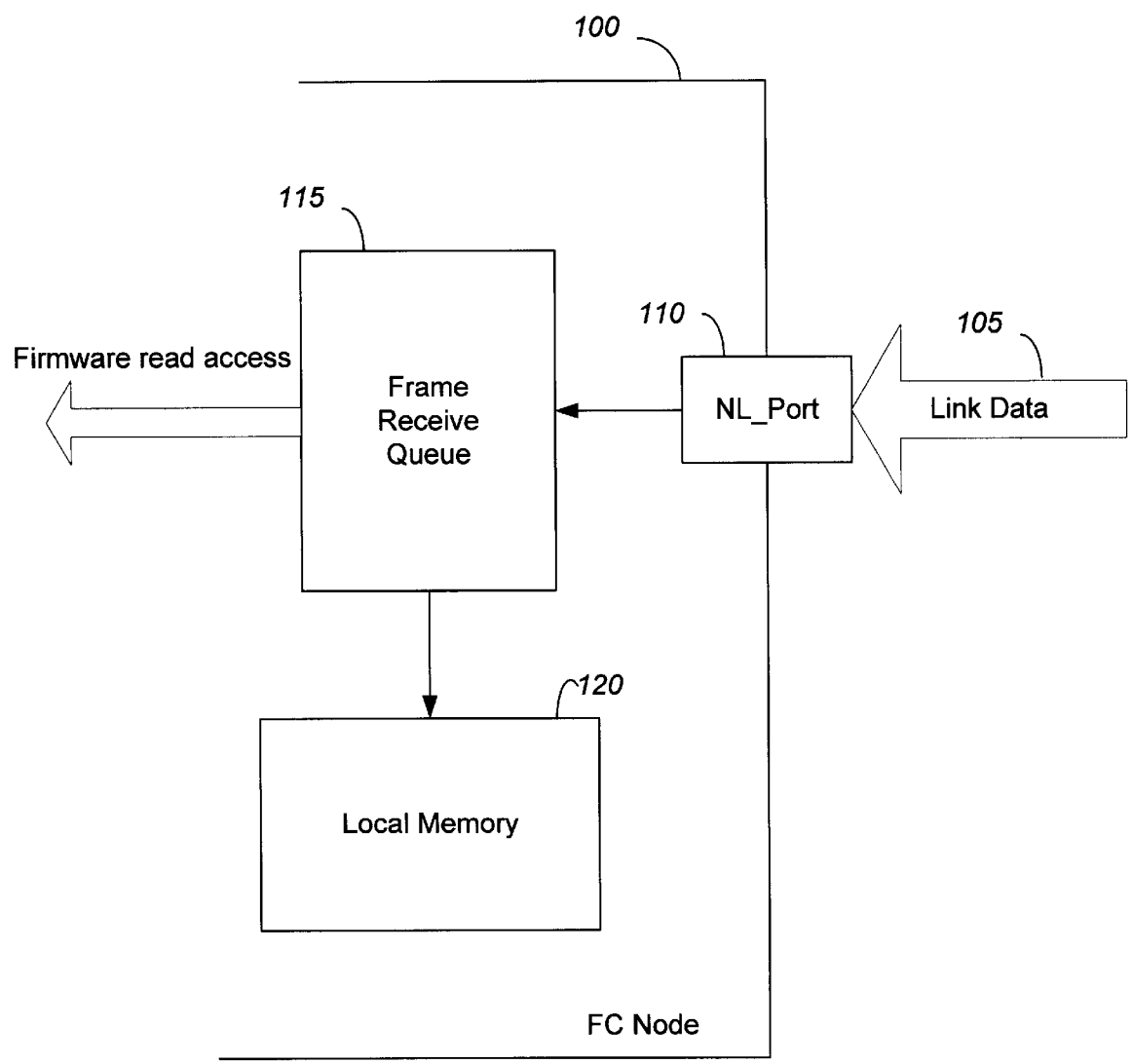
FIG. 1 is a block diagram of a node in a Fibre Channel network.

FIG. 1 shows a node 100 in a Fibre Channel network. The Fibre Channel network may operate in accordance with the American National Standards Institute (ANSI) X3T11 Fibre Channel Standards, e.g., X3.230. The node may be connected to a Fibre Channel Arbitrated Loop (FCAL) 105 by a port 110, e.g., a Fibre Channel Link NL_Port. A Frame Receive Queue (FRxQ) 115 may interconnect the port 110 and a local memory 120 in the node. The FRxQ 115 may include hardware that pre-processes frames received from the port 110 as they are received, e.g., at "wire speed."

Figure 2:
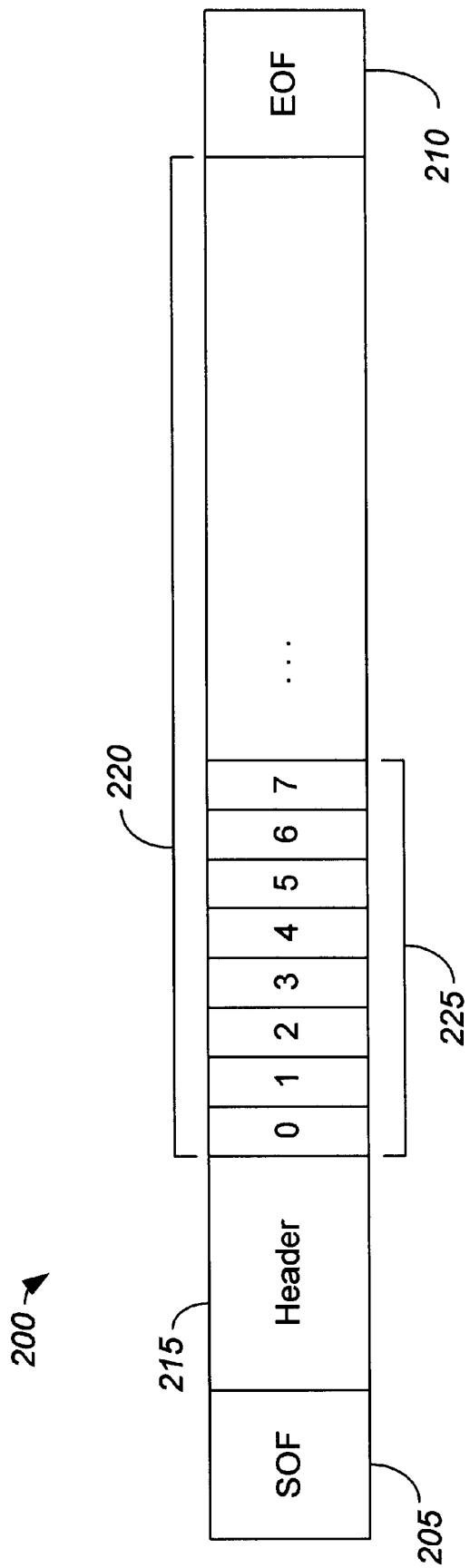
FIG. 2 is a block diagram of a Fibre Channel frame.

FIG. 2 shows a Fibre Channel frame 200. A Start of Frame (SOF) delimiter 205 and End of Frame (EOF) delimiter 210 mark the beginning and end of each Fibre Channel frame. A header 215 contains information about the frame, including the S_ID (Source Identifier), D_ID (Destination identifier), routing information, the type of data contained in the payload, and sequence/exchange management information. A payload 220 contains the actual data to be transmitted, and may be 0–2112 bytes in length. The first eight words 225 in the payload may also include information about the frame 200, e.g., XFR_RDY (Transfer Ready) and FCP_ (Response Information Set) messages.

Figure 3:
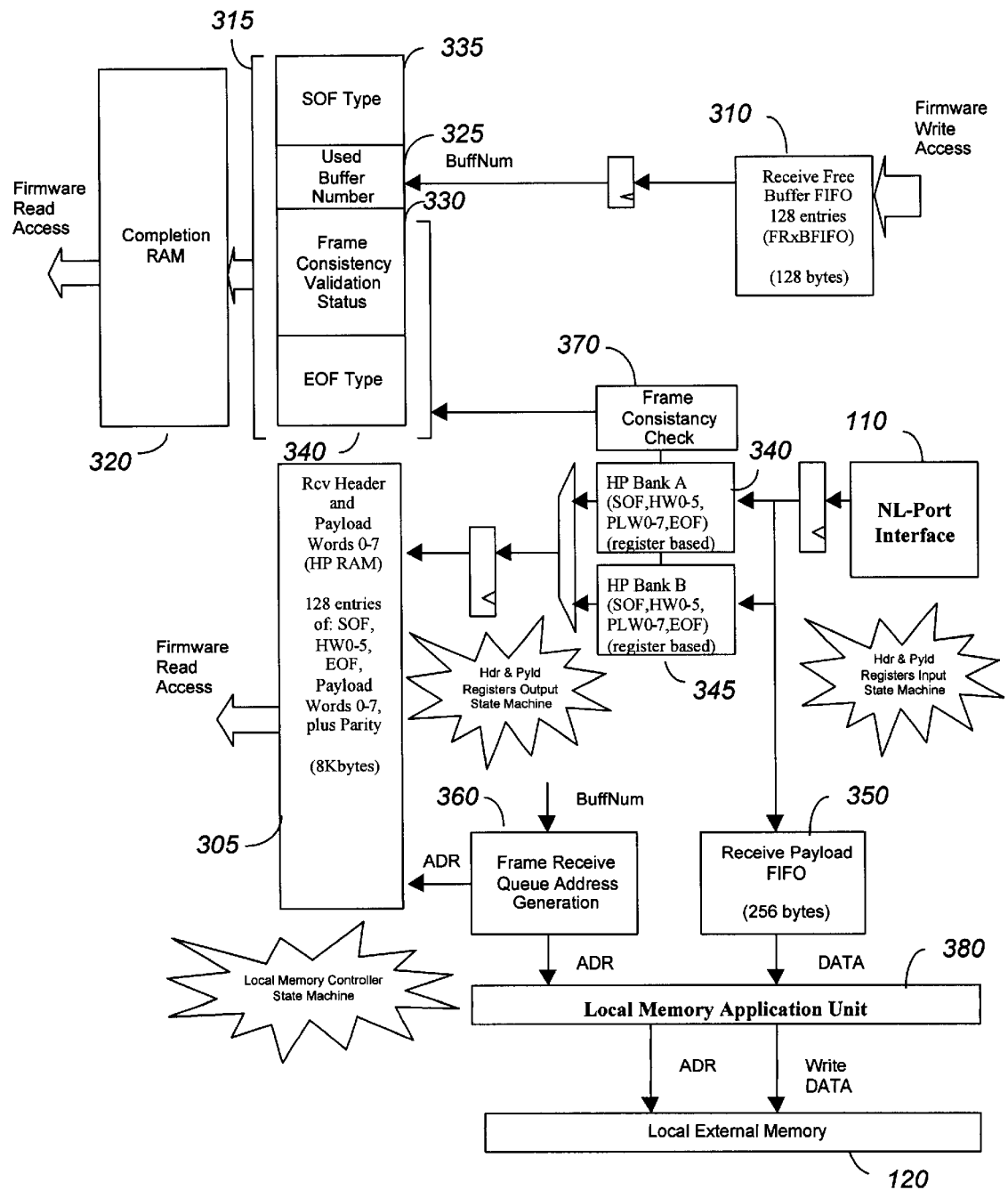
FIG. 3 is a block diagram of a frame receive queue in the node.

FIG. 3 is a block diagram of the FRXQ 115. The FRXQ 115 may separate a received frame into header and payload components. The header data 215 and the first eight words (PLW 0–7) 225 of the payload 220 may be stored in an on-chip memory, e.g., a Header & Payload (HP) RAM 305. The payload data 220, including the first eight payload words 225, may be stored in the local memory 120.

The HP RAM 305 may sit on the processor bus, and may be accessed by the processor at relatively high speeds. The local memory 120 may have a larger storage capacity than the HP RAM, but may have a larger access latency for small transfers.

The first eight words of payload data may be written to both the HP RAM 305 and the local memory 120. Placing this information in the high performance memory, HP RAM 305, allows the processor quick access to information embedded in the first eight payload data words if the information in these words is required to complete frame processing. If so, the processor can access the first eight payload words in the HP RAM 305 using, e.g., processor cache-line fill, or "burst," operations.

The FRxQ 115 may use buffer numbers that are pre-loaded by firmware to generate the destination address for the header 215 and payload 220 data. A Receive buffer FIFO 310 may store 128 buffer numbers. Each buffer number may select a 64-byte region of the HP RAM 305 and a 4 Kbyte region of local memory 120.

The FRXQ 115 may perform a consistency check to determine if the current receive frame is the next expected frame in a sequence of frames. To make this determination, the FRxQ 115 may save the previous frame header and compare it against the current frame header. The FRxQ 115 may write an entry 315 into a Completion RAM 320. The entry 315 may contain the buffer number 325, frame validation results 330, and SOF type 335, and EOF type 345 when the current frame has been written to the HP RAM 305 and local memory 120.

Figure 4:
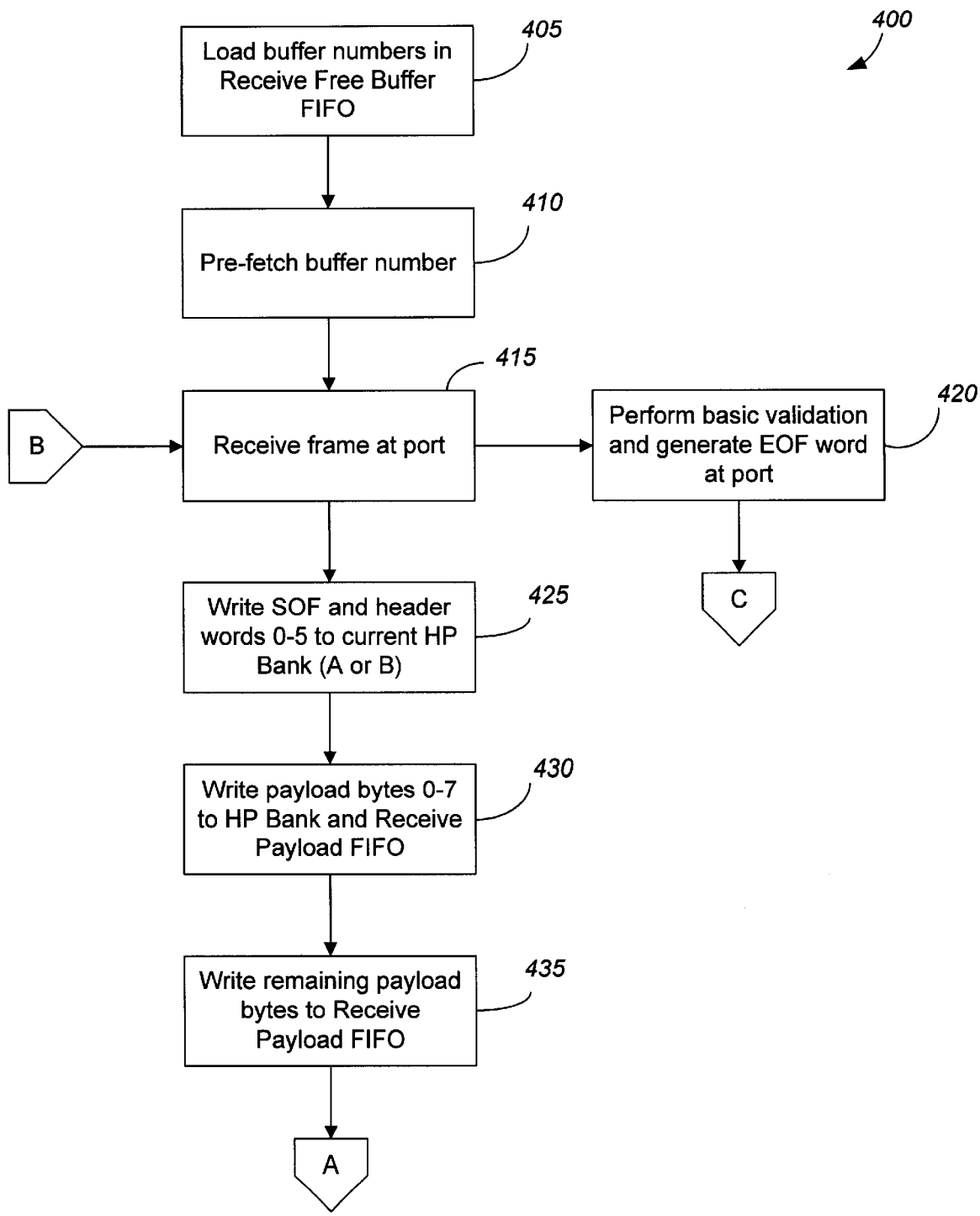
FIGS. 4–5 show a flowchart describing a frame pre-processing operation performed by the frame receive queue.
Figure 5:
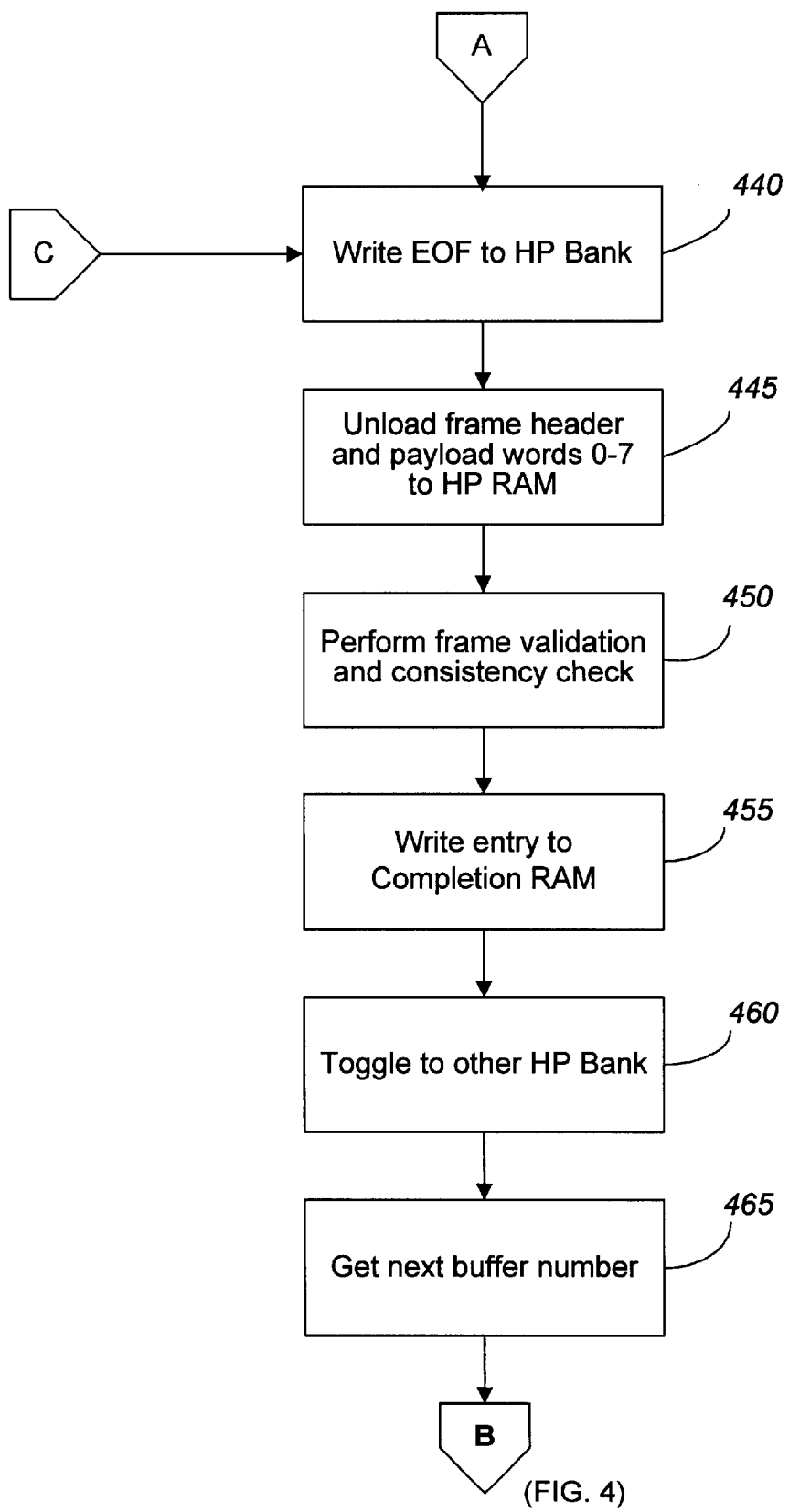

FIG. 4 is a flowchart describing a frame pre-processing operation 400 that may be performed by the FRxQ 115. Initially, before receiving any Fibre Channel frames, the firmware pre-loads a Receive Buffer FIFO 310 with buffer numbers (block 405), e.g., up to 128 buffer numbers. These buffer numbers represent the amount of memory storage available to an initiator on the Fibre Channel link 105. The buffer numbers also serve as part of the local memory address and part of the HP RAM address where the information will be stored in these memories. The FRxQ 115 pre-fetches the buffer number and uses this buffer number (block 410) to process a Fibre Channel frame from the port 110 (block 415). An address generation unit 360 may use the buffer number to generate the addresses where the information for a frame is stored in the HP RAM 305 and the local memory 120.

While the NL_Port 110 performs basic frame validation and generates the EOF status word (block 420), the FRxQ 115 writes the SOF and Header Words 0–5 to one of two Header/Payload Register Banks, e.g., HP Bank A 340 or HP Bank B 345 (block 425). The FRXQ automatically ping-pongs between these two banks to prevent two frames from occupying a single bank. When payload words 0–7 are received, the payload data is copied into the current HP Bank as well as a Receive Payload FIFO 350 (block 430). The subsequent payload words are only written to the Receive Payload FIFO 350 (block 435). A Local Memory Application Unit (LMAU) 370 may use the address generated from the buffer number to write the payload data from the Receive Payload FIFO 350 into the local memory 120.

The EOF is written to the current HP Bank (block 440). The action of writing the EOF to the HP Bank may signal the FRxQ 115 to write the frame header and payload words 0–7 into the HP RAM 305 using the address generated from buffer number by the address generation unit 360 (block 445).

When the operation is complete, the receive frame will be split between two memories. The SOF, Header Words 0–5, EOF, and payload words 0–7 will be written to the HP RAM 305. For cases where the receive frame does not contain a payload or the payload is less than eight words, the unused HP Bank words may be set to an 0xFBFBFBFB fill pattern. The entire payload data is written to local memory 120.

A frame consistency check unit 370 may use the header information from a previous frame to check whether a current frame is the next expected frame in the series of frames (block 450). The frame consistency check unit 370 may perform a first pass validation operation on the frame, checking, e.g., whether the current frame and previous frame have the same sequence number and sequential frame numbers. This approach improves performance since the hardware can perform the frame validation checks in parallel. In other systems, the firmware must make these checks in a serial program flow.

The FRxQ 115 may then write an entry for the frame into the Completion RAM 315 (block 455). The entry 315 may contain the buffer number 325, frame validation results 330, and SOF type 335, and EOF type 340. In a subsequent operation, firmware may use the buffer number to locate the frame corresponding to the entry in the HP RAM 305 and local memory 120.

When the entry 315 has been written to the Completion RAM 320, the FRxQ 115 may toggle to the other HP Bank (block 460). The FRxQ may then retrieve the next buffer number from the Receive Buffer FIFO 310 (block 465) and process the frame in that bank.

The FRXQ 115 may receive and process frames at wire speed. This may enable the firmware to disassociate the frame processing rate from the link frame reception rate. Off-loading frame processing and disassembly work from firmware to the FRxQ 115 may reduce the number of operations that firmware performs to complete receive frame processing. This may improve performance in terms of frame input-output (IO) rates.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

What is claimed is:

1. A method comprising:
   receiving a frame including a header and a payload;
   assigning a partial address to the frame;
   storing the header in a first memory at a first memory address including said partial address;
   storing the payload in a second memory at a second memory address including said partial address;
   performing a validation operation on information in the frame; and
   storing an entry at a third memory address, the entry including the partial address and a result of the validation operation.

2. The method of claim 1, wherein said performing comprises performing a validation operation using information in the header.

3. The method of claim 2, wherein said performing the validation operation comprises performing a consistency check.

4. The method of claim 1, wherein the frame comprises a Fibre Channel frame.

5. The method of claim 1, wherein the frame includes a start of frame delimiter and an end of frame delimiter, and wherein said storing the entry includes storing the start of frame delimiter and the end of frame delimiter with the partial address and the result in the entry.

6. The method of claim 1, wherein the partial address comprises a buffer number.

7. The method of claim 1, wherein said storing the header in the first memory comprises storing a first eight words in the payload with the header in the first memory.

8. The method of claim 1, wherein said storing comprises storing the header in a first memory bank.

9. The method of claim 8, further comprising storing a header of a second received frame in a second memory bank, and storing a header of a third received frame in the first memory bank.

10. An apparatus comprising:
   a port operative to receive a frame including a header and a payload;
   a first memory;
   a second memory;
   an address generator operative to
      assign a partial address to the frame,
      generate a first memory address for the header from the partial address, and
      generate a second memory address for the payload from the partial address;

frame validation circuitry operative to perform a validation operation and generate a result; and a frame dissasembler operative to
store the header in the first memory at the first memory address,
store the payload in the second memory at the second memory address, and
store an entry at a third memory address, the entry including said result and the partial address.

11. The apparatus of claim 10, wherein the frame comprises a Fibre Channel frame.

12. The apparatus of claim 11, wherein the frame disassembler is further operative to store a first eight words in the payload with the header in the first memory.

13. The apparatus of claim 11, wherein the frame disassembler is further operative to extract a start of frame delimiter and an end of frame delimiter from the frame.

14. The apparatus of claim 13, wherein the entry further includes the start of frame delimiter and the end of frame delimiter.

15. The apparatus of claim 10, wherein the first memory has a smaller access latency than the second memory.

16. The apparatus of claim 10, further comprising an integrated circuit including
the first memory,
the third memory to which the third memory address is mapped,
the address generator,
the frame validation circuitry, and
the frame disassembler, and
wherein the second memory resides off of the integrated circuit.

17. The apparatus of claim 10, wherein the frame disassembler further includes two memory banks, and wherein the frame disassembler is further operative to alternate storing the headers of received frames between the two memory banks.

18. The apparatus of claim 10, wherein the frame validation circuit is operative to perform a consistency check.

19. A system comprising:
a port operative to receive a Fibre Channel frame including a header, a payload, a start of frame delimiter, and an end of frame delimiter;
a first random access memory (RAM);
a completion RAM;
a local memory;
an address generator operative to
assign a buffer number to the frame,
generate a first memory address including the buffer number, and
generate a second memory address including the buffer number;
frame validation circuitry operative to perform a consistency check using information in the header and generate a result; and
a frame disassembler operative to
store the header and a first eight payload words in the first RAM at the first memory address,
store the payload in the local memory at the second memory address,
generate an entry including the start of frame delimiter, the end of frame delimiter, the buffer number, and the result, and
store the entry in the completion RAM.

20. The system of claim 19, wherein the first RAM, the third RAM, and the frame disassembler are integrated on a chip, and
wherein the local memory is external to the chip.

21. The system of claim 20, wherein the frame disassembler further includes two memory banks, and wherein the frame disassembler is further operative to alternate storing the headers of received frames between the two memory banks.

* * * * *